G. R. BOTT.
BEARING AND MOUNTING THEREFOR.
APPLICATION FILED JUNE 26, 1916.
1,337,881.
Patented Apr. 20, 1920.
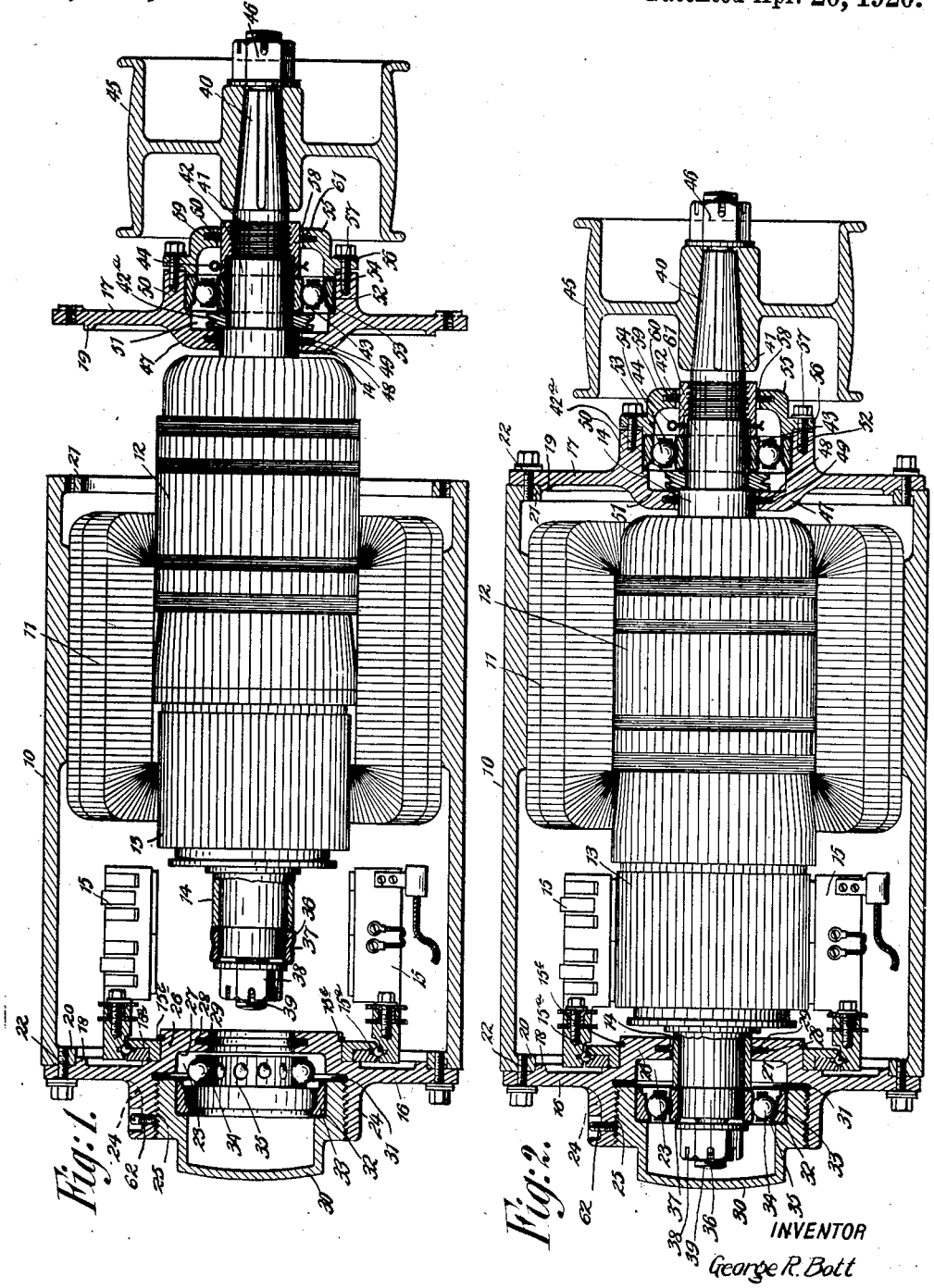
INVENTOR
George R. Bott
BY
ATTORNEY

UNITED STATES PATENT OFFICE.

GEORGE R. BOTT, OF NEW YORK, N. Y., ASSIGNOR TO THE NORMA COMPANY OF AMERICA, A CORPORATION OF NEW YORK.

BEARING AND MOUNTING THEREFOR.

1,337,881.  Specification of Letters Patent.  Patented Apr. 20, 1920.

Application filed June 26, 1916. Serial No. 105,886.

*To all whom it may concern:*

Be it known that I, GEORGE R. BOTT, a citizen of the United States, and residing in the borough of Manhattan, city and State of New York, have invented certain new and useful Improvements in Bearings and Mountings Therefor, of which the following is a specification.

The present invention relates to improvements in bearings and mountings therefor, and particularly bearings of the separable type, an object of the invention being to provide such a mounting which will be entirely free from dust or other foreign substances, will be adjustable and with the use of which the shaft bearings and other related parts may be readily assembled or disassembled. Another object is to provide such a bearing in which the lubricant will be effectually applied and which will require very little attention. The invention is especially intended for application in generators and motors, and is designed to permit the withdrawing of the armature for complete inspection without disturbing the mounting of the inner and outer races of the anti-friction bearings.

With these and other objects in view, my invention is shown in the accompanying drawings and will be hereinafter more fully described with reference thereto, and finally pointed out in the claims.

In the accompanying drawings:

Figure 1 is a sectional view of a dynamo provided at each end with bearings according to my invention, and before complete assembling, and Fig. 2 is a similar view showing the same assembled.

Similar reference characters indicate corresponding parts throughout the several figures of the drawings.

Referring to the drawings, and more particularly to Figs. 1 and 2 thereof, a cylindrical casing or field housing 10 is provided, in which is arranged the field magnet 11, armature 12, and commutator 13 upon a shaft 14 and brushes 15 in the customary manner. The ends of the casing 10 are closed by plates 16 and 17 having annular shoulders 18 and 19, which engage within the flanges 20 and 21 at the ends of the casing, and being secured thereto by bolts 22. On the outer face of the plate 16 and surrounding the central opening 23 thereof, there is provided a cylindrically extending shoulder 24, interiorly threaded as at 25, and on the inner face there is provided an inwardly extending flange 26 right angular in shape, and annularly within the inner diameter of the shoulder 24. The inner face of the flange 26 is curved as at 27, and the inner bearing surface is provided with an annular recess 28 of trough shape, in which is provided a felt ring 29. The brushes 15 are mounted upon bearings 15$^a$ disposed upon the flange 26, and held in place by a spring ring 15$^b$. A cap 30 is screwed into the threaded portion 25 of the shoulder, an annular recess 31 being then formed between the end of the cap and the end of the plate to allow for takeup or adjustment. An annular recess 32 is provided at the inner end of the cap, in which is disposed an outer ball race 33 of a separable bearing. The balls 34 and cage 35 are disposed in the housing when disassembling, and are adapted to be engaged with the inner race upon assembling as hereinafter pointed out, by a pressing action.

The inner end of the shaft 14 is contracted at 36, and is provided with the inner ball race 37 of the bearing, being held in place by a washer and lock nut 38 engaging the threaded end 39 of the shaft.

The pulley end of the shaft is tapered as at 40, screw threads 41 being provided on said tapered portion. Adjacent the threads 41 the shaft is contracted as at 42, and an inner ball race 43 is provided thereon, which is held in place by a collar 61 screwed upon the threaded portion 41, and locked in place by a cotter pin 44. An oil throw ring 42$^a$ is provided on the portion 42 between the shoulder of the shaft and the inner ball race. It will be noted that this ring limits the freedom of movement of the bearing on the pulley end, which is very desirable. A pulley 45 is keyed to the tapered portion 40, and is held in place by a lock nut 46.

The plate 17 which is adapted to be secured to the end of the casing 10 in a similar manner to the plate 16 when the shaft is slid in to place as shown in Fig. 2, is provided on its inner face with an inwardly and downwardly extending flange 47, having a felt ring 48 disclosed in a recess 49 thereof, and which engages the surface of the shaft. On its outer face the plate is provided with a cylindrically extending shoulder 50, of larger diameter than the central opening 51 of the plate, an outer ball race 52 engaging the inner surface of said shoulder and abutting at one end of the face of the plate adjacent the opening. Balls 53, and a cage 54 are disposed between the inner and the outer ball races. The outer ball race is held in position by a cap 55, provided with an annular flange 56 which engages the shoulder 50, bolts 57 securing the same in place. The bore 58 of the cap is provided with an annular recess 59, in which is disposed a felt ring 60 which engages the surface of the collar 61.

The action is as follows: Upon removal of the plate 17, and withdrawal of the armature, the inner or blind end of the armature shaft 14 on which the inner ball race 37 is rigidly mounted is withdrawn a distance until the cage and balls strike the flange 26 of the end plate 16. A further withdrawal of the shaft strips the cage and balls from the shaft, leaving them in the housing, the bore of the housing being of such size as to allow the inner race to pass through without interference. After a complete inspection has been made the reassembling takes place in the following manner: The cap 30 is removed carrying with it the outer ball race, which permits withdrawal of the cage and balls. The armature is then inserted into the field housing and the end plate 17 fastened into place. With the armature in position the cage and balls are replaced, whereupon the cap with the outer ball race is screwed into place, the cap adjusting the various parts into true alinement. The free area 23 (Fig. 2) it will be noted, which forms an oil well permits of the proper stripping of the cage and balls when withdrawing the shaft. The permanent mounting of the outer ball race in the cap 30, serves to protect the same during assembling and disassembling. The adjustable cap 30 permits of elimination of all axial freedom in the complete assembled unit, and is locked into place by a set screw 62 provided in the shoulder 24, or by any other means.

It will be noted that the disassembling is made without disturbing the fastening or holding means of the inner or outer ball races.

I have illustrated preferred and satisfactory forms of my invention, but it is obvious that changes may be made therein within the spirit and scope thereof as defined in the appended claims.

I claim:

1. In a bearing, the combination with a shaft and bearing support provided with an opening surrounding said shaft, of separable type anti-friction means including an inner race mounted on said shaft, and closure means engaging said support inclosing said anti-friction means at one side, said support inclosing said means at the other side, said shaft being removable with said inner race through said opening of said support.

2. In a bearing, the combination with a shaft and bearing support, of separable type anti-friction means mounted on said shaft, said support being provided with a bore engaging said shaft at a point inwardly removed from said anti-friction means, and providing a recess between said anti-friction means and said bore, adapted to receive said anti-friction means when said shaft is moved longitudinally outwardly through said bore.

3. In a bearing, the combination with a shaft and bearing support, of separable type anti-friction means comprising an inner ball race and an outer ball race and balls mounted therebetween, said inner ball race being mounted on said shaft, said support being provided with closure means at one end and a bore at the other end engaging said shaft at a point inwardly removed from said anti-friction means, and between said closure means and said bore, with an enlarged bore surrounding said anti-friction means, and supporting said outer ball race, and providing a recess between said anti-friction means and said first mentioned bore, adapted to receive said balls when said shaft is moved longitudinally outwardly through said bore.

4. In a bearing, the combination with a shaft and bearing support, of separable type anti-friction means comprising an inner ball race and an outer ball race and balls mounted therebetween, said inner ball race being mounted on said shaft, said support being provided with closure means at one end, and a bore at the other end, engaging said shaft at a point inwardly removed from said anti-friction means, and between said closure means and said bore, with an enlarged bore surrounding said anti-friction means, and supporting said outer ball race, said first mentioned bore being of larger diameter than the diameter of said inner ball race, and adapted to permit longitudinal movement of said shaft and inner ball race therethrough.

5. In a bearing, the combination with a shaft of bearing supports and anti-friction means disposed within said supports and engaging said shaft, one of said supports and anti-friction means being mounted as a unit upon said shaft and movable therewith, said shaft being movable longitudinally with respect to said other support and anti-friction means, said anti-friction means adapted to be stripped from said shaft and retained by said support as said shaft is moved longitudinally.

6. In a bearing, the combination with a shaft, of bearing supports, bearing means on one portion of said shaft mounted as a unit with respect to one of said supports, and movable with said shaft, and bearing means on another portion of said shaft, comprising separable type anti-friction means consisting of inner and outer races, and anti-friction members mounted therebetween, said inner race being mounted on said shaft, and said outer race being carried by said other support, said other support being provided with a bore engaging said shaft at a point inwardly removed from said anti-friction means, said shaft and said inner ball race being movable longitudinally with respect to said support and said outer ball race and antifriction means.

7. In a bearing the combination with a shaft, of bearing supports, bearing means on one portion of said shaft mounted as a unit in one of said supports, and movable therewith, and bearing means on another portion of said shaft, comprising separable type anti-friction means consisting of inner and outer races, and anti-friction members mounted therebetween, said inner race being mounted on said shaft, said other support being provided with a bore engaging said shaft at a point inwardly removed from said anti-friction means and surrounding and annularly spaced from said anti-friction means, and closure means inclosing the end of the shaft, adjustable and removably engaging the bore of said support surrounding said anti-friction means and supporting the outer ball race of said anti-friction means, said shaft adapted to be disassembled from said last named support by withdrawal together with said other support and said unit bearing, said withdrawal removing said anti-friction members from said outer race, and stripping the same from said inner race upon engagement with the shaft engaging portion of said last named support.

In testimony that I claim the foregoing as my invention I have signed my name in presence of two subscribing witnesses.

GEORGE R. BOTT.

Witnesses:
 A. H. GRAYBURN,
 H. C. DU FRESNE.